K. OKAZAKI.
HEAT RETAINER.
APPLICATION FILED APR. 8, 1918.
1,278,988.
Patented Sept. 17, 1918.
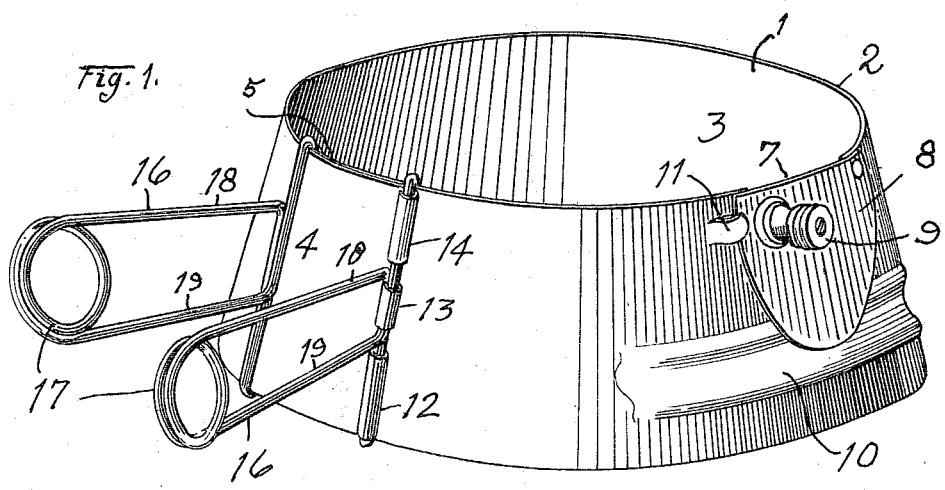
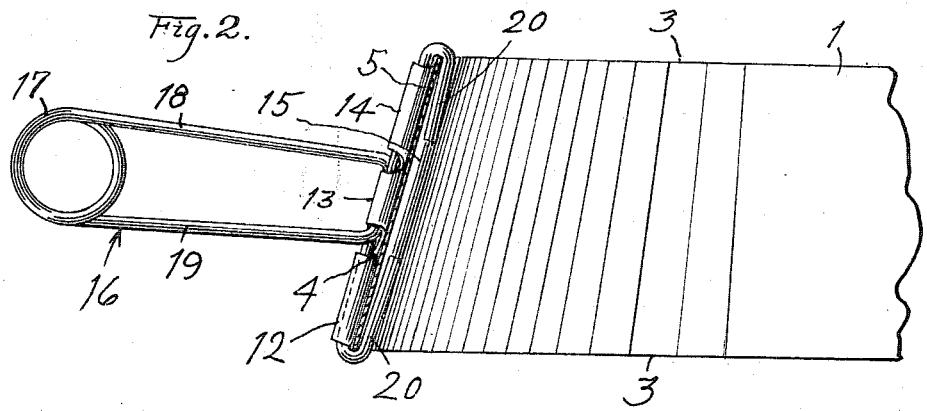
INVENTOR=
Keinosuke Okazaki
By His Atty,
Edward N. Kojima

UNITED STATES PATENT OFFICE.

KEINOSUKE OKAZAKI, OF LOS ANGELES, CALIFORNIA.

HEAT-RETAINER.

1,278,988.  Specification of Letters Patent.  Patented Sept. 17, 1918.

Application filed April 8, 1918.  Serial No. 227,225.

*To all whom it may concern:*

Be it known that I, KEINOSUKE OKAZAKI, a subject of the Emperor of Japan, residing at Los Angeles, in the county of Los Angeles and State of California, have invented a new and useful Heat-Retainer, of which the following is a specification.

This invention relates to an improved device for use with cooking utensils, whereby the same are jacketed above the place of combustion, and the heat that is generated from combustion will be conserved and uniformly distributed relative to the cooking utensil; the device hereinafter set forth, being an improvement on the heat retainer described and claimed in my application for Letters Patent of the United States, bearing Serial Number 217,080, and filed February 14, 1918.

The objects of this invention are to provide means for incasing and jacketing the bottom portions of various articles and cooking utensils when placed over a fuel burner, thereby preventing waste of the heat produced, and distributing the heat so that all parts may be heated alike; and to provide means for quick adjustment whereby the device may be adapted for various stoves and burners, and for various forms and sizes of cooking utensils; and to provide a simple device which will be inexpensive to produce.

While simple and efficient means are herein provided for accomplishing the objects of the invention, and the elements shown and described are well adapted to serve the purposes intended, it is to be understood that the invention is not limited to the precise construction shown in the drawings, but that changes and alterations that may fall within the scope of the claims, are included.

A practical embodiment of the invention is shown in the accompanying drawings, in which:

Figure 1 is perspective view of a heat retaining device made in accordance with my invention. Fig. 2 is a fragmental and sectional elevation of the same.

Referring to the drawings, the heat retainer is provided with a frusto-conoidal body 1, converging at the top 2, and defining substantially circular openings 3, and consisting of a sheet metal band, having overlapping ends 4 and 5, adjustable to enlarge or constrict the top and bottom openings. Slot 7, provided for the spout of a kettle, has a swing door 8, and a handle 9, and is normally maintained in the closed position by the corrugated portion 10, of the body, and by the lug 11.

End 4 is provided with loops 12, 13, and 14, and the inner end 5 has a single loop 15. Handles 16, are provided with spring loops 17, upper bails 18, lower bails 19, and inwardly bent ends 20, which serve to retain the overlapping ends in coöperative position to form a substantially circular-walled body. The handle attached to the outer end 4 is arranged with the upper bail 18, passing through loop 12, and around the lower edge of the body, and with the lower bail 19, passing through loops 13, and 14, and around the upper edge of the body, said ends 20 being spring-pressed to grip the body in any adjusted position. The handle attached to the inner end 5, has the inwardly bent ends slidably mounted in loop 15, said ends being spring-pressed to grip the body and retain the device in adjusted position.

To change the device in accordance with the size of the kettle or cooking utensil to which the heat retainer may be applied, the handle bails are pressed together in the hand, and the handles are then shifted relatively toward and from one another.

In use the body is adapted to surround the lower portion of the kettle or cooking utensil, and the converging walls will inclose a jacket of heated air, thereby conserving the heat that arises from the burner. The inwardly bent ends 20, of the handles, are thus interposed between the top edge of the heat retainer and the article to be heated in connection therewith, and serve to maintain a narrow annular space at the top, sufficient for draft purposes. Practically all of the heat units that are generated by the burner are converged and directed against the article to be heated, and entrapped within the jacketed space within the heat retainer; the entrapped air serving to prevent the flame of combustion from reaching the kettle or cooking utensil, and preventing scorching of the contents thereof.

What is claimed is:

1. A heat retaining band arranged with overlapping ends, loops on the overlapping ends, wire elements forming handles for the band, said wire elements passing through said loops and over the top and bottom edges of the band, and spring loops in the wire elements operating to grip the handles to the heat retaining band.

2. A band arranged with overlapping ends, loops on the overlapping ends, handles having spring loops and bails, said bails passing through the loops on the overlapping ends, and gripping the edges of the band.

3. A band arranged with overlapping ends, loops on the overlapping ends, wire loops forming handles, and slidably mounted in the loops on the overlapping ends, and spring loops in the handles, said handles being compressible to adjust the overlapping ends and vary the size of the band.

In testimony whereof I hereunto affix my signature this 26th day of March, in the year 1918.

KEINOSUKE OKAZAKI.

In presence of—
J. D. WASTED,
S. HATAYE.

Copies of this patent may be obtained for five cents each, by addressing the "Commissioner of Patents, Washington, D. C."